United States Patent Office.

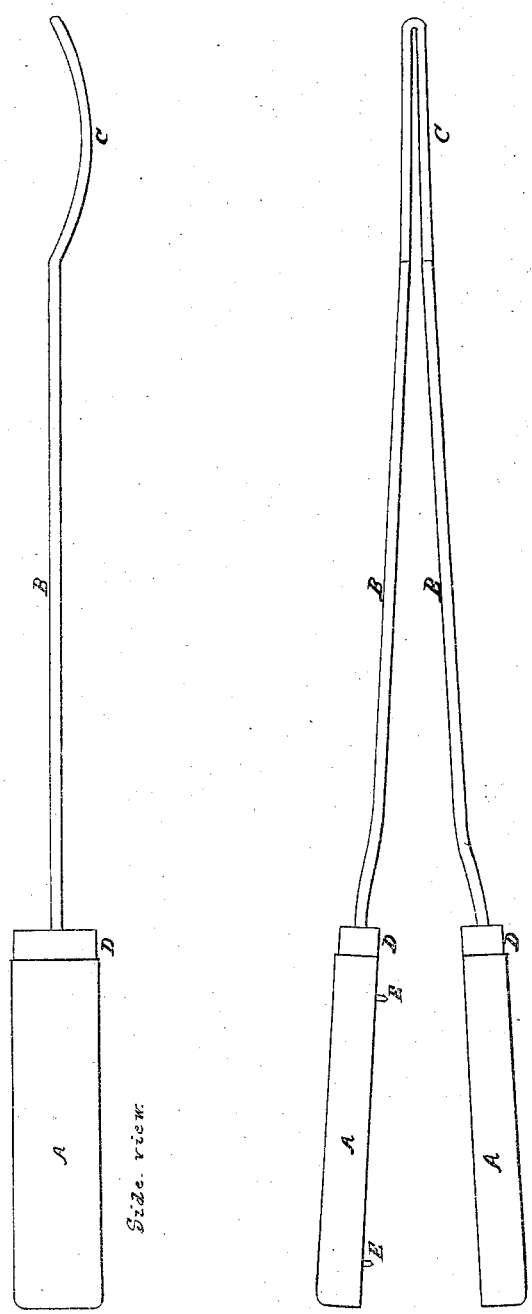

ABRAM G. NEWKIRK. OF WARREN, PENNSYLVANIA.

Letters Patent No. 73,745, dated January 28, 1868.

---

IMPROVEMENT IN LAMP-CHIMNEY CLEANERS.

---

*The Schedule referred to in these Letters Patent and making part of the same.*

---

TO WHOM IT MAY CONCERN:

Be it known that I, ABRAM G. NEWKIRK, of the borough of Warren, in the county of Warren, and State of Pennsylvania, have invented a new and useful Machine for Cleaning Lamp-Chimneys; and I do hereby declare that the following is a full, clear, and exact description of my invention and discovery, and of the manner and process of making, constructing, using, and compounding the same, reference being had to the annexed drawing, which is made a part of this specification.

B B are a wire or piece of brass or other metal or metallic substance, bent double, and the ends securely fastened at D D to the handle A A. C is a curve or bow in the wire or other metallic substance, so shaped as to most nearly adapt itself to the shape of the inner surface of a glass chimney of a lamp. The handle A A is of wood, and composed of two pieces, so made that the pieces can be drawn apart, as in Figure 2, and kept in their places when closed by the pins E E.

The manner of preparing the instrument for use is to separate the pieces composing the handle A A, as represented in fig. 2, and inserting between B B a piece or quantity of paper, cloth, or other suitable material, and pushing such material up to the curve C, in such a manner as to have it extend outwardly from the curve C, and cover the same. Then close the handle A A, as represented in Figure 1, which keeps the paper, cloth, or other material firmly in its place at C, and is ready for use.

I clean chimneys with this machine, by inserting the curve C, holding the paper or other material, into the lower end of the chimney, and rubbing with it the moistened surface of the glass chimney until cleaned.

I claim the rod or wire B B, constructed and bent in the form substantially as shown, and arranged in the manner and for the purpose specified.

ABRAM G. NEWKIRK.

Witnesses:
DAVID McKELVY,
G. W. ALLEN.